United States Patent [19]

Nienaber et al.

[11] Patent Number: 4,863,233
[45] Date of Patent: Sep. 5, 1989

[54] FIBER OPTIC INTERCONNECT SYSTEM

[75] Inventors: David K. Nienaber, Rolling Meadows; Gary G. Schoeffel, Island Lake, both of Ill.

[73] Assignee: Zenith Electronics Corporation, Glenview, Ill.

[21] Appl. No.: 193,464

[22] Filed: May 12, 1988

[51] Int. Cl.4 .......................... G02B 6/36; H04B 3/28; G02F 1/00; H04N 3/12
[52] U.S. Cl. ............... 350/96.20; 350/96.22; 350/96.23; 350/96.10; 307/91; 307/119; 358/212; 358/226; 358/901; 358/903; 455/612; 455/617; 439/610
[58] Field of Search ............... 350/96.10, 96.20, 96.21, 350/96.22, 96.23; 358/333, 10, 55, 339, 212, 226, 901, 903; 307/91, 117, 119; 455/612, 613, 617; 439/45, 46, 63, 577, 607, 608, 610

[56] References Cited

U.S. PATENT DOCUMENTS

| 4,081,208 | 3/1978 | Meade | 350/96.20 |
|---|---|---|---|
| 4,427,977 | 1/1984 | Carollo et al. | 358/901 X |
| 4,481,426 | 11/1984 | Nakagawa et al. | 307/91 |
| 4,705,960 | 11/1987 | Lovrenich | 350/96.10 X |
| 4,739,521 | 4/1988 | Akimoto | 455/612 |
| 4,758,719 | 7/1988 | Sasaki et al. | 350/96.20 |
| 4,767,181 | 8/1988 | McEowen | 350/96.20 X |
| 4,802,725 | 2/1989 | Borne et al. | 350/96.20 |
| 4,817,202 | 3/1989 | Meyer et al. | 455/612 X |

FOREIGN PATENT DOCUMENTS 59-158689 9/1984 Japan .............................. 358/901 X Primary Examiner—William L. Sikes
Assistant Examiner—Brian M. Healy

[57] ABSTRACT

An EMR containment system coupling an EMR contained computer chassis and a wide band video monitor includes three plastic fiber optic cables terminated in a plug at each end. The computer chassis includes a socket having an electrically conductive surface in which three cylindrical fiber optic wave guides are positioned, each having at least a 3/1 ratio of length to diameter. Optical diodes are positioned at the end of each wave guide for coupling wide band R, G and B video and sync signals to and from the fiber cables when the plugs are seated within the sockets. A microswitch communicates with the rear of one of the sockets and is physically operable by a removable actuator carried by the mating plug for selecting between monochrome and color monitors.

9 Claims, 2 Drawing Sheets

FIBER OPTIC INTERCONNECT SYSTEM

BACKGROUND OF THE INVENTION AND PRIOR ART

This application relates in general to systems for containing incidental electromagnetic radiation (EMR) and in particular to such a system including a computer chassis or the like for supplying wide band video signals to a video monitor.

It is well known that interconnecting cables undesirably radiate and are also susceptible to electromagnetic signals. For most applications, conventionally shielded interconnecting cables are adequate. In the presence of large electromagnetic signals, such as in a factory where heavy electrical machinery is in operation, fiber optic cables have been used to couple signals between separated points.

It is also known in the prior art to use a fiber optic cable link to couple a low data rate binary signal, between a pair of computer devices that have been individually arranged to contain incidental EMR of relatively low magnitude, for security reasons. The nature of a binary signal and the relatively low data rate employed permitted use of a relatively low cost, plastic fiber cable in that application without encountering excessive EMR levels.

Since most computer systems include a chassis that is physically removed from its associated video monitor, an interconnecting cable is required. As mentioned, such cables emit objectionable levels of EMR despite the use of very expensive shielding. An obvious solution to produce a system with very low EMR would be to incorporate the video monitor and the chassis in a common enclosure that is treated to contain EMR. This solution entails a great decrease in flexibility in terms of design and installation and is not considered practical. What the art requires and has failed to provide is a practical and economically feasible system for containing EMR in a system incorporating a physically separated chassis and a wide band video monitor. To provide flexibility, the system should also be coupled by separable connector devices.

The present invention solves the above problem in the art by the use of a plastic fiber optical link to interconnect the chassis and the video monitor. Both the chassis and the video monitor components are constructed to contain EMR and the inventive system incorporates a shielded connector socket, an electrical-to-optical transducer arrangement and a connector plug that preserves the EMR containment integrity of the components.

OBJECTS OF THE INVENTION

A principal object of the invention is to provide a novel interconnect system for containing EMR.

Another object of the invention is to provide an EMR contained interconnect system for coupling an electrical chassis and a wide band video monitor.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
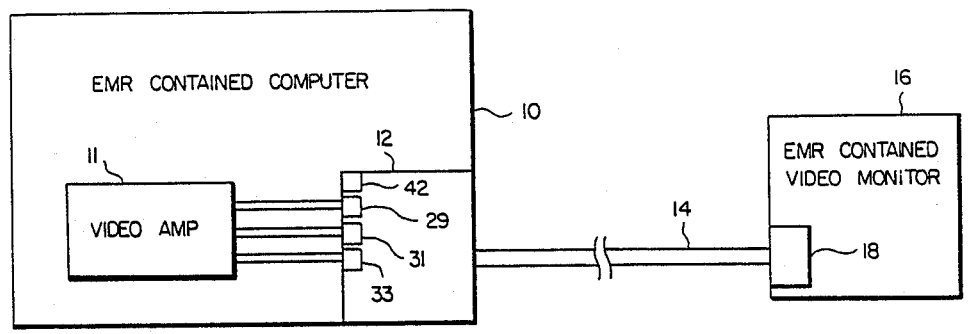
FIG. 1 is a simplified representation of a computer and monitor interconnected by a fiber optic link in accordance with the invention.

Referring to FIG. 1, a block 10, labelled EMR Contained Chassis, should be understood to include any type of electronic apparatus that generates or carries especially wide band analog video signals (e.g. having a bandwidth of 10 MHz or greater). An inner block 11, labelled Video Amp, develops red (R), green (G) and blue (B) video signals and appropriate horizontal and vertical sync signals for application to a plurality of electrical-to-optical transducers 29, 31 and 33, respectively. These transducers, which in the preferred embodiment are photo diodes, are physical adjacent to an EMR contained connector system 12 that provides a communication port to the environment outside of chassis 10. It will be appreciated that chassis 10 may be EMR contained in a variety of well known ways, including, but not limited to, being surrounded with electrically conductive material. A switch device 42 is also in communication with the connector system 12. As mentioned, chassis 10 may be completely shielded in the sense that a continuous conductive surface is maintained, with the exception of fiber optic wave guides as will be discussed, to contain EMR. The connector system may be fabricated of conductive material or suitably plated to assure the integrity of the electrical shield.

A fiber optic cable 14, consisting of three plastic optical fibers, extends over the relatively short distance (generally six feet or less) between computer 10 and a video monitor 16. For convenience, both computer 10 and video monitor 16 may include connector systems, with the connector system 18 being illustrated in video monitor 16. As should be obvious, the electrical R, G and B video signals from video amplifier 11 are converted into corresponding optical signals by electrical-to-optical transducers 29, 31 and 33 and transmitted along the respective individual fibers of the fiber optic cable 14 where they are reconverted to electrical format by similar optical-to-electrical transducers (not shown).

With R, G and B signals, it is also necessary to send horizontal and vertical sync signals. Rather than use an additional fiber cable, the individual horizontal and vertical sync signals may be added to two of the R, G and B signals. For example, the vertical sync signal may be added to the R signal and the horizontal sync signal added to the B signal. Suitable circuitry for recovering the sync signals would be included in video monitor 16.

Figure 2:
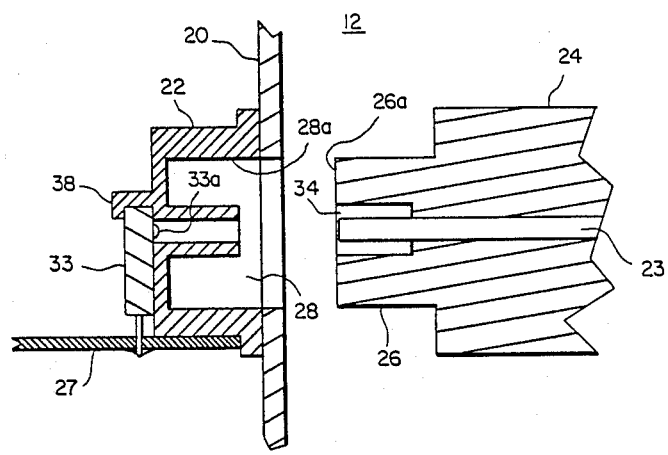
FIG. 2 is a cross sectional view of a connector plug and socket for connecting the electrical chassis to the fiber optic cable.
Figure 3:
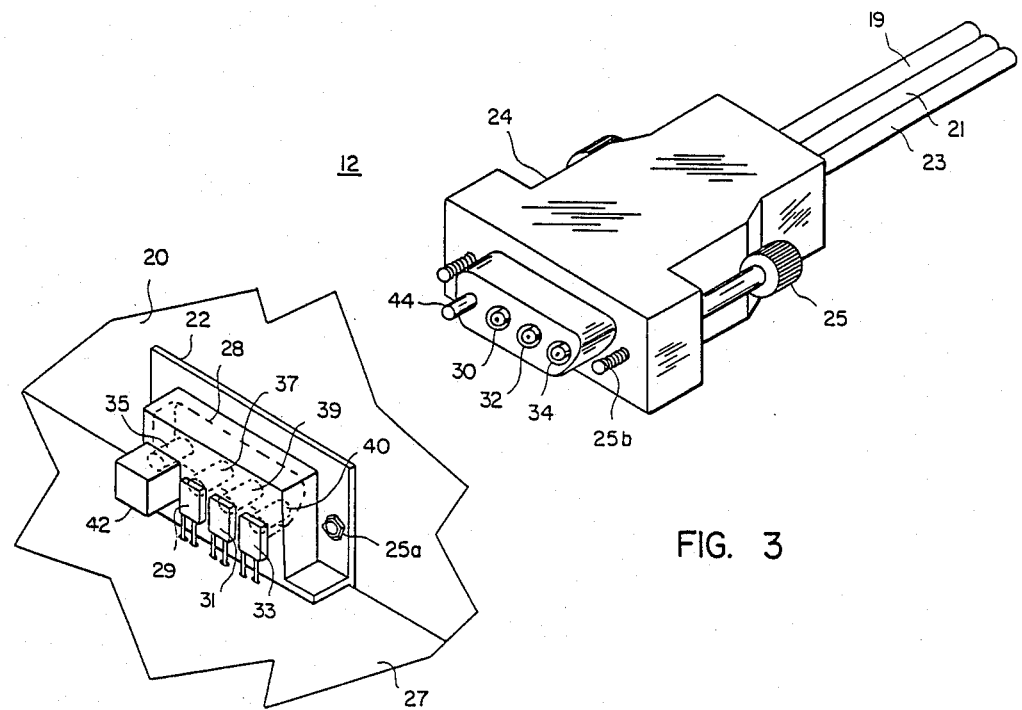
FIG. 3 is a perspective view of the connector socket and plug arrangement utilized to connect fiber optic cables to an electrical chassis.
Figure 4:
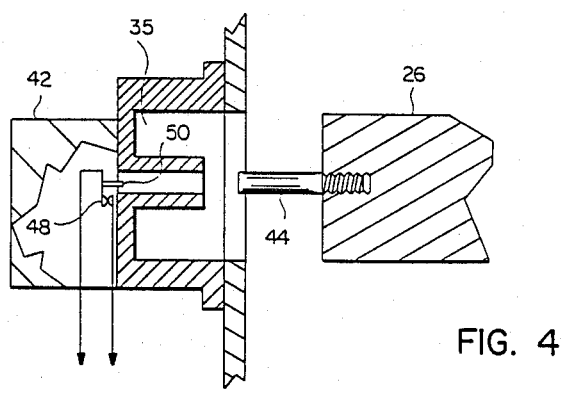
FIG. 4 is a sectional view illustrating the physical placement and operation of a monochrome/color switch in the interconnect system of the invention.

FIG. 2 and FIG. 3 show the two parts of the connector system. The part within computer 10 consists of a socket 22 that is mounted in a suitable opening in a wall 20 of the computer chassis or cabinet. Socket 22 defines a cutout 28 for reception of a plug 24 that includes a projecting front portion 26 configured to mate within cutout portion 28. Three plastic fibers 19, 21 and 23 are maintained in fixed alignment in plug 24 by any suitable well-known means and project through appropriate apertures 30, 32 and 34 in front portion 26 of plug 24.

The inner surface 28a of cutout 28 in socket 22 and the external surface 26a of front portion 26 of plug 24 are configured such that plug 24 is guided into correct position in socket 22 so that the individual fibers 19, 21 and 23 carried by plug 24 are in alignment with a plurality of wave guides 37, 39 and 40 that extend from the back wall of socket 22. The wave guides are cylindrical in configuration and preferably are of unitary construction with the socket 22. The wave guides provide the only openings to the outside from within the computer chassis. To minimize EMR, the wave guides have a ratio of length to diameter that is at least 3/1.

Socket 22 is shown mounted on a printed circuit board 27 and includes a rearwardly extending lip 38 on the back thereof for helping to captivate and align three photo diodes 29, 31 and 33 that have corresponding light-emitting tips such as tip 33a (FIG. 2) in alignment with the open end at the back of the optical wave guides. The photo diodes are electrically connected to printed circuit board 28 by suitable leads.

As mentioned, socket 22 and wave guides 37, 39 and 40 may be fabricated of cast metal and may include suitable fastener means for firmly retaining the plug 24 in engagement therewith. As illustrated, these fastener means may include a pair of threaded apertures 25a that are engageable with the threaded ends 25b on a pair of thumb screws 25 that project through the body of plug 24. The three plastic optical fibers 19, 21 and 23 carried by plug 24 are centrally located in cylindrical holes 30, 32 and 34 in the face of front portion 26 of plug 24. The inner diameters of these holes are only slightly larger than the outer diameters of the wave guides with which they engage. Similarly the inner diameters of the wave guides are only slightly greater than the outer diameters of the fibers. This dimensioning provides a reasonably "snug fit" between the wave guides, plug and optical fibers.

A switch 42 is also connected to the rear surface of socket 22 and is physically engageable by a switch actuator 44 that is removably mounted in the face of front portion 26 of the plug 24. When actuator 44 is in place, it engages the actuating element 50 of switch 42 to physically force open a contact set 48 therein. When actuator 44 is not present, contact set 48 remains closed. In a monochrome installation for example, contact set 48 being open can condition suitable circuitry (not shown) in the computer to generate R, G and B signals that are suitable for use with a monochrome display monitor. On the other hand, if a color display monitor is connected, actuator 44 would not be used and contact set 48 would remain closed.

As discussed, only the openings at the rear of wave guides 35, 37, 39 and 40 present the possibility of EMR escaping from the computer chassis to the outside. Forming these wave guides with at least a 3/1 ratio of length to diameter significantly reduces the level of EMR escaping. To facilitate mating of the plug and socket with the fibers in the correct position with respect to the wave guides, the inner surface 28a of cutout portion 28 in socket 22 is configured with respect to the outer surface 26a of front portion 26 of plug 24 and assures alignment therebetween prior to entry of the ends of the fibers into their respective wave guides. As more clearly shown in FIG. 2, the end of the wave guide is set back from the forward surface of socket 22 to afford an opportunity for plug 24 to line up with cutout 28 prior to entry of the fibers into the wave guides.

It will be appreciated that a similar connector system, consisting of a plug at the other end of fiber optic cable 14 and a socket in the video monitor, may be used. Since the monitor is also EMR contained, the only exposed link between the computer and the video monitor is the fiber cable which does not emit EMR.

Accordingly, with the invention the integrity of an EMR contained computer chassis and an EMR contained wide band video monitor is retained. This is accomplished with a relatively short length of plastic fiber cable and suitable connector system for providing flexibility in installation and security in operation. It is recognized that numerous modifications and changes in the described embodiment of the invention will be apparent to those skilled in the art without departing from its true spirit and scope. The invention is to be limited only as defined in the claims.

What is claimed is:

1. In combination:
   an EMR contained computer chassis;
   means in said chassis for generating a wide band video signal comprising R, B and G signals;
   an EMR contained wide band video monitor; and
   a plastic fiber optic link including three separate cables carrying said wide band video signal between said chassis and said monitor.

2. The combination of claim 1, further including:
   a shielded connector socket in each of said chassis and monitor; and
   a plug supporting said three plastic cables at each end thereof for mating with a respective one of said sockets.

3. The combination of claim 2 wherein each socket contains tubular receptacles adapted to receive the ends of said plastic cables, the length of said receptacles being three times the diameter.

4. An EMR contained system comprising:
   a socket including a continuous electrically conductive surface;
   a fiber optic receptacle, dimensioned to inhibit EMR propagations in said socket;
   an optical transducer communicating with one end of said fiber optic receptacle;
   plug means for engaging said socket and said receptacle; and
   said plug means supporting an optical fiber for positioning in said receptacle adjacent to said optical transducer.

5. The system of claim 4 wherein said receptacle comprises a cylinder having a continuous electrically conductive surface and an inner diameter for receiving said optical fiber, said cylinder being dimensioned to have a leat a 3/1 ratio of length to diameter.

6. The system of claim 5, further including switch means positioned in communication with said socket; and
   switch actuation means carried by said plug means for physically operating said switch means by insertion of said plug means into said socket.

7. An EMR contained system comprising:
   a socket including a continuous electrically conductive surface;
   a fiber optic receptacle in said socket, said fiber optic receptacle being cylindrical in configuration, having a continuous electrically conductive surface, an inner diameter for receiving an optical fiber, and at least a 3/1 length to diameter ratio;

an optical transducer in communication with one end of said receptacle;

a plug for engaging said socket and said receptacle in a predetermined orientation, said plug carrying an optical fiber for positioning in said fiber optic receptacle adjacent said optical transducer;

switch means in communication with said socket; and switch actuation means carried by said plug for physically operating said switch means upon insertion of said plug into said socket.

8. In combination:

an EMR contained wide band video monitor;

an EMR dontained computer chassis including signal means generating R, G and B video and sync signals;

a fiber optic link comprising three optical fibers for transmitting said R, G and B video and sync signals between said video monitor and said computer chassis;

a connector system including;

an electrically shielded socket within each of said computer chassis and monitor and having three cylindrical fiber optic receptacles positioned therein, said receptacles having at least a 3/1 ratio of length to diameter;

three optical diodes coupled between said signal generating means and respective ones of said fiber optic receptacles; and a plug supporting said three optical fibers at each end of said fiber optic link and engageable with a respective one of said sockets with individual ones of said optical fibers positioned in respective ones of said receptacles and in optical communication with respective ones of said diodes.

9. The combination of claim 8, further including a color/monochrome switch in communication with at least one of said sockets; and removable actuating means on the corresponding one of said plugs for physically actuating said color/monochrome switch when said plug is positioned within said socket.

* * * * *